United States Patent
Klein

(10) Patent No.: US 12,346,241 B1
(45) Date of Patent: Jul. 1, 2025

(54) SYSTEM, METHOD, AND COMPUTER PROGRAM FOR UNATTENDED TEST EXECUTION BASED ON IMPACTED APPLICATION CODE

(71) Applicant: Amdocs Development Limited, Limassol (CY)

(72) Inventor: Yasmin Bel Klein, Beit Kama (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 147 days.

(21) Appl. No.: 18/122,060

(22) Filed: Mar. 15, 2023

(51) Int. Cl.
*G06F 11/3668* (2025.01)

(52) U.S. Cl.
CPC ...... *G06F 11/3688* (2013.01); *G06F 11/3692* (2013.01)

(58) Field of Classification Search
CPC ............. G06F 11/3688; G06F 11/3692; G06F 11/3668–3698
See application file for complete search history.

(56) References Cited

U.S. PATENT DOCUMENTS

| | | | |
|---|---|---|---|
| 7,178,063 B1 * | 2/2007 | Smith | G06F 11/3688 717/124 |
| 8,276,126 B2 * | 9/2012 | Farnham | G06F 11/3688 717/131 |
| 8,984,485 B2 | 3/2015 | Elshishiny et al. | |
| 10,733,087 B2 * | 8/2020 | Wiener | G06F 11/3688 |
| 10,936,471 B2 * | 3/2021 | Cauley | G06F 11/3688 |
| 11,042,473 B2 * | 6/2021 | Joyce | G06F 11/3688 |
| 11,068,387 B1 * | 7/2021 | Bakshi | G06F 11/3688 |
| 11,662,997 B2 * | 5/2023 | Farrier | G06F 11/3688 717/101 |
| 2015/0082277 A1 | 3/2015 | Champlin-Scharff et al. | |
| 2016/0321586 A1 * | 11/2016 | Herzig | G06F 11/3688 |
| 2019/0332523 A1 * | 10/2019 | Gefen | G06N 7/01 |
| 2021/0357314 A1 * | 11/2021 | Wu | G06F 11/3688 |
| 2023/0010781 A1 * | 1/2023 | Ningappa | G06F 11/3688 |

OTHER PUBLICATIONS

Anonymous, "Tricentis LiveCompare: Smart impact analysis for SAP," 13 pages, retrieved Mar. 15, 2023 from https://www.tricentis.com/products/impact-analysis-livecompare.
Anonymous, "Teamscale—a code quality & test analysis tool for teams," 11 pages, retrieved Mar. 15, 2023 from https://www.cqse.eu/en/teamscale/overview/.
Anonymous, "Impact Testing: Stop waiting for tests you do not need to run," 9 pages, retrieved Mar. 15, 2023 from https://schibsted.com/blog/impact-testing-stop-waiting-tests-not-need-run/.
Anonymous, "Reducing Test Times by Only Running Impacted Tests—for Maven & Java," 6 pages, retrieved Mar. 15, 2023 from https://paulhammant.com/2015/01/11/reducing-test-times-by-only-running-impacted-tests/.

\* cited by examiner

*Primary Examiner* — Geoffrey R St Leger
(74) *Attorney, Agent, or Firm* — Zilka-Kotab, P.C.

(57) ABSTRACT

A system, method, and computer program are provided for unattended test execution based on impacted application code. A change made to an application is detected. One or more features of the application impacted by the change made to the application are determined. A plurality of existing tests associated with the one or more features of the application impacted by the change made to the application are identified. A probability of each existing test in the plurality of existing tests exposing a defect in the application is predicted. At least a portion of the plurality of existing tests are executed for the application in an order that based on the predicted probabilities.

11 Claims, 5 Drawing Sheets

SYSTEM, METHOD, AND COMPUTER PROGRAM FOR UNATTENDED TEST EXECUTION BASED ON IMPACTED APPLICATION CODE

FIELD OF THE INVENTION

The present invention relates to software design.

BACKGROUND

Continuous Integration (CI) is a key practice in the software industry for enabling new feature introduction rapidly into production. Integrations are frequent, and in most of the cases verified with an automated build that runs regression tests or sanity to detect integration errors as soon as possible. However, as the codebase grows and matures, integration is becoming more complex. As more services are developed, the regression test suite grows incrementally with each and every release, to the extent that running a full regression suit takes time (e.g. hours or even days).

In addition, as integration is becoming more complex, the initial stage of the design from the requirement level to the effort estimation and delivery estimation becomes an impossible mission.

There is thus a need for addressing these and/or other issues associated with the prior art. For example, there is a need for initial design and development estimations, as well as unattended test execution, for software.

SUMMARY

As described herein, a system, method, and computer program are provided for unattended test execution based on impacted application code. A change made to an application is detected. One or more features of the application impacted by the change made to the application are determined. A plurality of existing tests associated with the one or more features of the application impacted by the change made to the application are identified. A probability of each existing test in the plurality of existing tests exposing a defect in the application is predicted. At least a portion of the plurality of existing tests are executed for the application in an order that based on the predicted probabilities.

DETAILED DESCRIPTION

Figure 1:
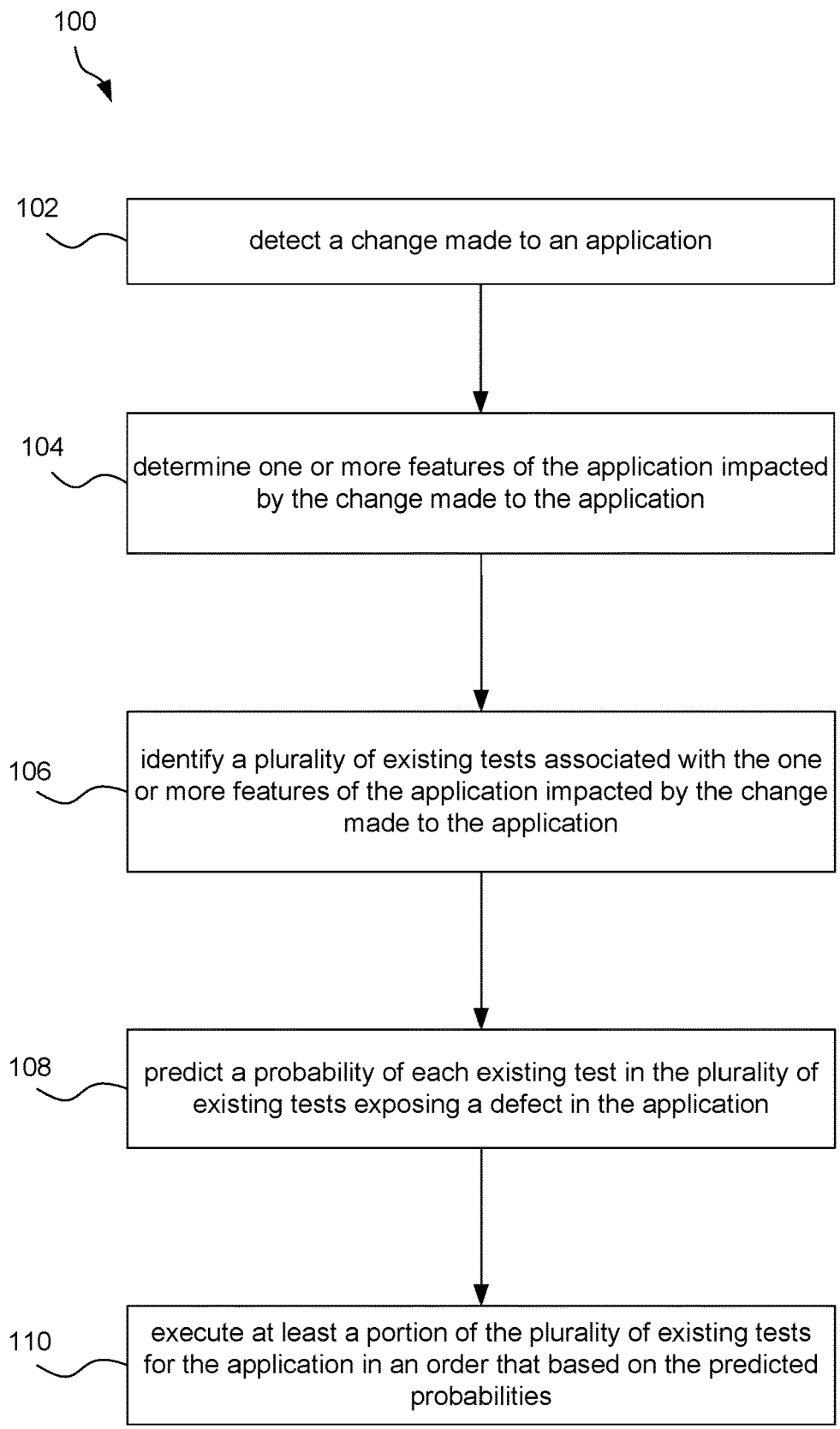
FIG. 1 illustrates a method for unattended test execution based on impacted application code, in accordance with one embodiment.

FIG. 1 illustrates a method 100 for unattended test execution based on impacted application code, in accordance with one embodiment. The method 100 may be carried out by a computer system, such as that described below with respect to FIGS. 4 and/or 5. In an embodiment, the computer system may implement testing for an application. For example, the computer system may include a test environment for testing the application.

In operation 102, a change made to an application is detected. In operation 104, one or more features of the application impacted by the change made to the application are determined. With respect to the present description, the application refers to any computer-executable application. The application may be a front-end application having user interfaces for interaction with a user, in an embodiment. In another embodiment, the application may be a back-end application that communicates with one or more backend systems (e.g. servers, etc.).

The change made to the application refers to any change made to code of the application. In an embodiment, the change may include a modification to existing code of the application. In another embodiment, the change may include new code added to existing code of the application. The change may be made by a user (e.g. developer) via an application development tool, in an embodiment. Further to this embodiment, the change made to the application may be detected responsive to a code check-in made by the user.

In operation 104, one or more features of the application impacted by the change made to the application are determined. The features of the application refer to any portions (e.g. functions, interfaces, etc.) of the application. In an embodiment, the one or more features of the application impacted by the change made to the application may include one or more portions of code impacted by the change made to the application. In another embodiment, the one or more features of the application impacted by the change made to the application may include one or more services impacted by the change made to the application.

In an embodiment, the one or more features of the application impacted by the change made to the application may be determined based on a portion of the application to which the change was made. As another example, any other portion of the application that depends on the portion of the application to which the change was made may be determined as a feature of the application impacted by the change. As yet another example, any service used by the application that depends on the portion of the application to which the change was made may be determined as a feature of the application impacted by the change.

In operation 106, a plurality of existing tests associated with the one or more features of the application impacted by the change made to the application are identified. An existing test refers to a test already (i.e. previously) created. The existing test may have been created by a user or an automated process. The existing test may have been created for the application. The existing test may be manual test or an automated test, in various embodiments.

As noted above, the plurality of existing tests that are identified are those associated with the one or more features of the application impacted by the change made to the application are identified. Thus, only existing tests associated with (i.e. configured to test) features of the application either directly or indirectly impacted by the change made to the application may be identified. In this way, existing tests associated with non-impacted features of the application (i.e. those not affected by the change made to the application) may be excluded from being identified in operation 106.

In an embodiment, the plurality of existing tests may be identified from a test repository of existing tests. In an embodiment, the test repository may store each of the existing tests with an indication of one or more application features to which the existing test applies. The one or more application features to which the existing test applies may be determined based on data captured during an execution (i.e. prior execution) of the existing test. In another embodiment, a separate mapping repository may store an indication of one or more application features to which each existing test in the test repository applies. To this end, the plurality of existing tests associated with the one or more features of the application impacted by the change made to the application may be identified by querying the test repository and/or mapping repository using the one or more features of the application determined to be impacted by the change made to the application.

In operation 108, a probability of each existing test in the plurality of existing tests exposing a defect in the application is predicted. The defect refers to any undesired (i.e. unintended) functioning of the application. For example, the defect may be an error, failure, etc. occurring during execution of the application.

In an embodiment, the probability of each existing test in the plurality of existing tests exposing a defect in the application may be predicted based on stored data indicating prior defects detected by the existing test when applied to at least a portion of the one or more features of the application. This defect information (i.e. data) may be stored in association with the existing test itself, for example where the existing test is stored in a test repository of existing tests as noted above. In another embodiment, this defect information may be stored in association with an indicator of the existing test, for example where the defect information is stored in a mapping repository (mentioned above) that maps defect information to indicators of existing tests, and for example where the existing test itself is stored in a test repository of existing tests.

In an embodiment, the probability of each existing test in the plurality of existing tests exposing a defect in the application may be predicted using a machine learning model. The machine learning model may be trained on the testing repository and/or mapping repository data mentioned above.

In operation 110, at least a portion of the plurality of existing tests are executed for the application in an order that based on the predicted probabilities. In an embodiment, all of the existing tests associated with the one or more features of the application impacted by the change made to the application may be executed in an order that based on the predicted probabilities. In another embodiment, only a subset of the existing tests associated with the one or more features of the application impacted by the change made to the application may be executed in an order that based on the predicted probabilities. For example, all of the existing tests, or a selected subset thereof, may be executed from most probable to expose a defect in the application (first) to least probable to expose a defect in the application (last).

Where only a subset of the existing tests are executed, the subset of the plurality of existing tests may be selected based on a defined (i.e. maximum) number of tests to be selected for testing the application. In another embodiment, the existing tests included in the subset may be those having a highest probability of exposing a defect in the application. With respect to this embodiment, the existing tests included in the subset may be ordered for execution from most probable to expose a defect in the application to least probable to expose a defect in the application.

While defect probability is described an aspect for prioritization of the existing tests, it should be noted that other aspects for prioritization may also be considered. In an example, if the change is made to an application which tends not to change on frequent basis and/or impacts minimal/few set of features comparing to the rest of the changes, then any corresponding tests will be labeled as low priority. In another example, if the change doesn't impact the functionality (i.e. tagging was added/documentation was added and no real change in the actual service), then the corresponding test will be de-prioritized as well. As another example, service vulnerability may also be considered, where if the service does not tend to change frequently then it may be prioritized differently from if the service tends to change on a daily bases (i.e. where many users are working and changing/modifying this service/direct impact services).

In an embodiment, a regression flow may be built using the plurality of existing tests, or the selected subset thereof, in the order that based on the predicted probabilities. The plurality of existing tests, or the selected subset thereof, may then be executed as part of performing the regression flow.

To this end, the method 100 provides an automated process for determining a suite of existing tests to be used to test code of the application impacted by a change made to the application, as well as the order in which the existing tests are to be executed. By identifying and executing only tests that apply to features of the application impacted by the change made to the application, execution of tests irrelevant to the impacted features of the application may be avoided, which in turn will save computing resources otherwise used to execute such irrelevant tests. Furthermore, by executing the identified tests in order of their probability to detect a defect, a likelihood of detecting defects early in the test execution process may be improved. Early defect detection may allow for early intervention (manual or automated) in correcting such defects in the application.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
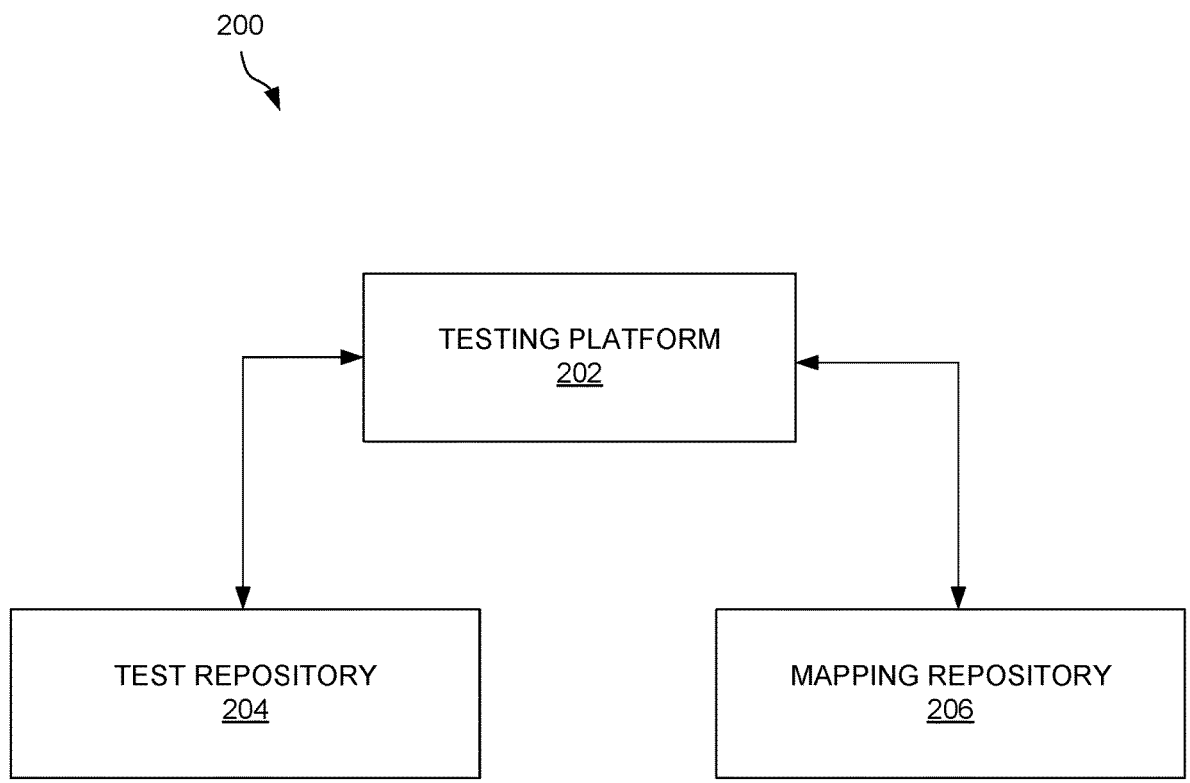
FIG. 2 illustrates a flow diagram of a system for unattended test execution based on impacted application code, in accordance with one embodiment.

FIG. 2 illustrates a flow diagram of a system 200 for unattended test execution based on impacted application code, in accordance with one embodiment. As an option, the system 200 may be implemented in the context of the details of the previous figure and/or any subsequent figure(s). For example, the system 200 may be implemented on one or more computing systems. Of course, however, the system 200 may be implemented in the context of any desired environment. Further, the aforementioned definitions may equally apply to the description below.

The system 200 includes a testing platform 202 having access to both a test repository 204 and a mapping repository 206. While the test repository 204 and the mapping repository 206 are shown as independent repositories, it should be noted that other embodiments are considered where the data stored in such repositories is instead combined in a single repository. Additionally, while the testing platform 202 is shown as independent of the test repository 204 and the mapping repository 206, other embodiments are considered where such repositories are components of the testing platform 202.

The testing platform 202 is a combination of programs and data that are configured for use in testing applications. In an embodiment, the testing platform 202 includes a test environment in which manual and/or automated tests are executed on an application. The testing platform 202 may include user interfaces for receiving user input during manual test execution and/or for outputting results of any manual or automated test execution. The testing platform 202 may also interface a development tool via which users make changes to the application.

The testing platform 202 includes a process configured to automatically build a test suite for execution, specifically when a change is made to an application. In particular, the testing platform 202 detects a change made to an application. For example, the testing platform 202 may be triggered (notified) when a code check-in occurs within the development tool. Responsive to detecting the change, the testing platform 202 determines one or more features of the application impacted by the change made to the application. This may include code and/or services impacted by the change made to the application.

The testing platform 202 then identifies a plurality of existing tests associated with the features of the application identified as being impacted by the change made to the application. The plurality of existing tests are stored in the test repository 204, and may include manual tests and/or automated tests. However, a mapping of the existing tests in the test repository 204 the application features that are tested by those existing tests is stored in the mapping repository 206. The testing platform 202 may query the mapping repository 206 for which existing tests in the test repository 204 are correlated with the features of the application impacted by the change made to the application.

The testing platform 202 determines a probability of each existing test in the plurality of existing tests exposing a defect in the application is predicted. This probability may be predicted using a machine learning model that processes, for each of the existing tests, data indicating prior defects detected by the existing test, and that outputs a probability of a defect being detected during a subsequent execution of the existing test. The data indicating prior detected defects may be stored in the mapping repository 206 for each of the existing tests. It should be noted that FIG. 3 below described an embodiment of how the mapping repository 206 may be updated, per existing test in the test repository 204, with correlations of application features and data on detected defects.

Further, the testing platform 202 selects which of the existing tests identified by the testing platform 202 for the application change are to be used for testing the application. In an embodiment, all of the identified existing tests may be selected. In another embodiment, only a defined number of tests with a highest probability of detecting a defect may be selected. The selected existing tests may form a test suite for testing the application based on the detected change made to the application.

The testing platform 202 may then order the (e.g. selected) existing tests based on the predicted probabilities (i.e. from highest probability of detecting a defect to lowest probability of detecting a defect). It should be noted that other aspects may also be used as a basis for ordering (i.e. prioritizing) the existing tests, such as how frequently the application is changed and/or if the change impacts minimal/ few set of features comparing to the other changes made to the application (e.g. in which case the corresponding tests will be labeled as low priority). In another example, if the change doesn't impact the functionality (i.e. tagging was added/documentation was added and no real change in the actual service), then the corresponding test will be de-prioritized as well.

In an embodiment, the testing platform 202 may build a regression flow with the ordered existing tests. The testing platform 202 executes at least a portion of the plurality of existing tests for the application in the order that is based on the predicted probabilities. For example, the testing platform 202 may perform the regression flow by executing the existing tests in the defined order. In an embodiment, the testing platform 202 may execute the tests by retrieving them from the test repository 204 for execution.

By building a test suite of effective (relevant) testing for a particular change made to an application, and by ordering the tests by probability of detecting a defect, the number of defects reported late in the process (or even after delivery of the application to customers) may be reduced. This ultimately results in less time wasted on bug fixes and rework, fewer midsprint interruptions, and more resources to focus on innovation. Further, the test to code correlation mentioned above also streamlines the defect remediation process. Especially with end to end tests, finding the code responsible for a test failure can be like searching for a needle in a haystack. With this correlation, a very precise path from the test sequence detecting a problem to the code that's responsible for it may be determined.

In an additional embodiment, the mapping repository 206 may be used during the application design process. For example, when designing a new feature for the application or modifying an existing feature, the mapping repository 206, including the mapping of application features to existing tests and related defect probability, can be used (e.g. by machine learning or natural language processing) to understand an implication of the design on the application/ services, such as the amount of existing tests available for testing the new design, the defect probability, a number of affected services, and/or implication on development effort. This information may help to better design and plan resources for the application.

In this regard, a change to a design of an application may be detected. For example, the change may be made via the design tool mentioned above. One or more features of the application impacted by the change may be determined, such as a new feature added to the design or an existing feature in the design that is modified. A plurality of existing tests mapped to the one or more features of the application are identified. A probability of each existing test in the plurality of existing tests exposing a defect in the application is predicted. An indication of the plurality of existing tests and the corresponding defect probability is output. For example, the output may help a user in determining whether to implement the change to the application.

The solution described herein can help estimate the development and fixing effort based on the information that is collected. For each feature in any system, such Jira, etc., there is a breakdown of development estimation per story, feature and epic—when correlating all these data the solution described herein will be able to help in predicting the design and development time.

Figure 3:
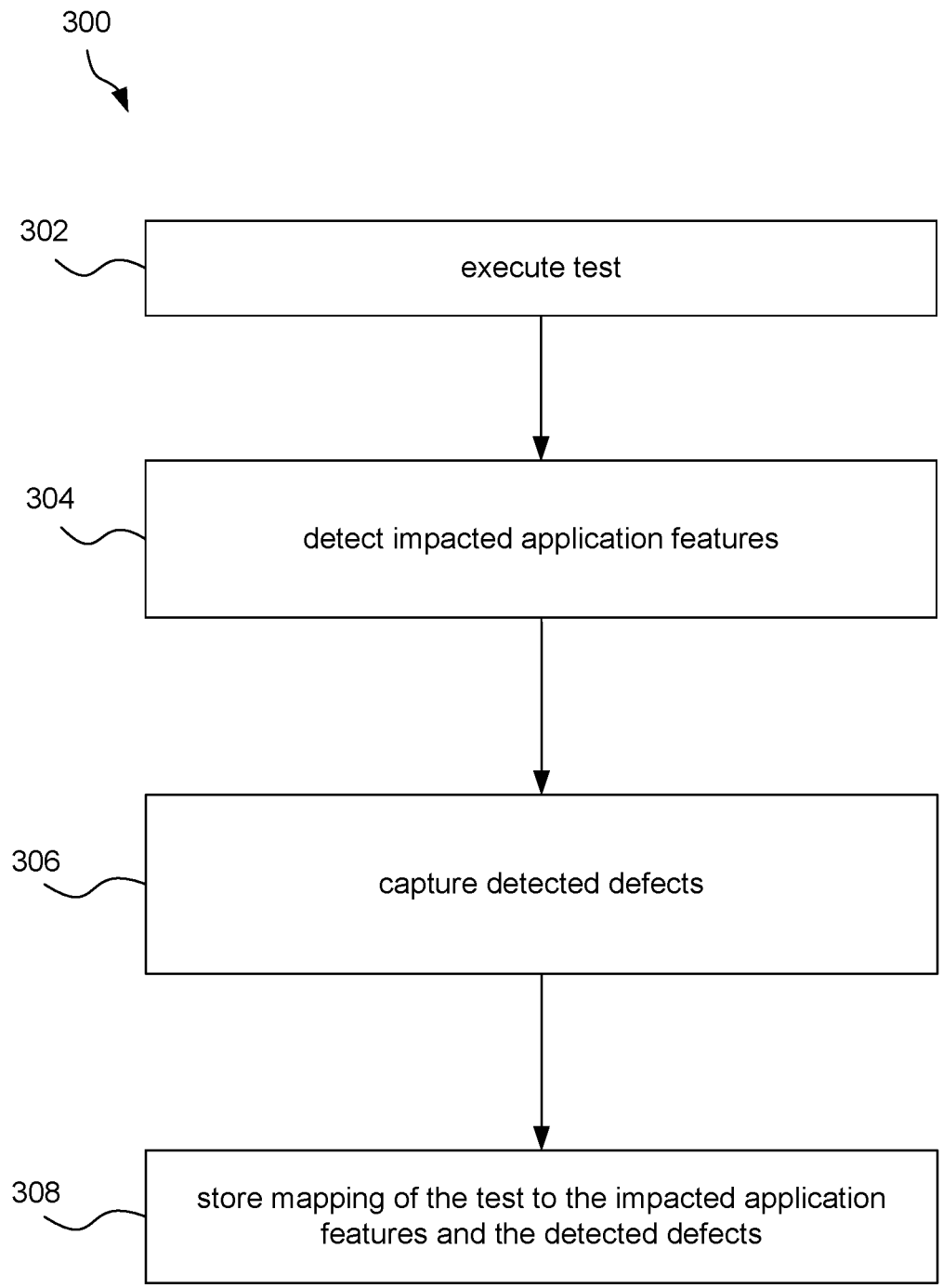
FIG. 3 illustrates a method for capturing data during test execution for use in building a test suite corresponding to impacted application code, in accordance with one embodiment.

FIG. 3 illustrates a method 300 for capturing data during test execution for use in building a test suite corresponding to impacted application code, in accordance with one embodiment. As an option, the method 300 may be carried out in the context of the details of the previous figure and/or any subsequent figure(s). For example, the method 300 may be carried out by the testing platform 202 of FIG. 2 for updating the mapping repository 206 of FIG. 2. Of course, however, the system 200 may be implemented in the context of any desired environment. Further, the aforementioned definitions may equally apply to the description below.

In operation 302, a test is executed. The test refers to an existing test executed on an application based on a detected change made to the application. In operation 304, application features impacted by the test are detected. The application features impacted by the test refer to features of the application that are tested for defects via execution of the test. For example, execution of the test may be monitored to detect which features of the application are tested via execution of the test.

In operation 306, any defects detected from execution of the test are captured. In operation 308, a mapping of the test to the impacted application features and the detected defects is stored. For example, the mapping may be stored in a mapping repository (e.g. mapping repository 206 of FIG. 2).

Figure 4:
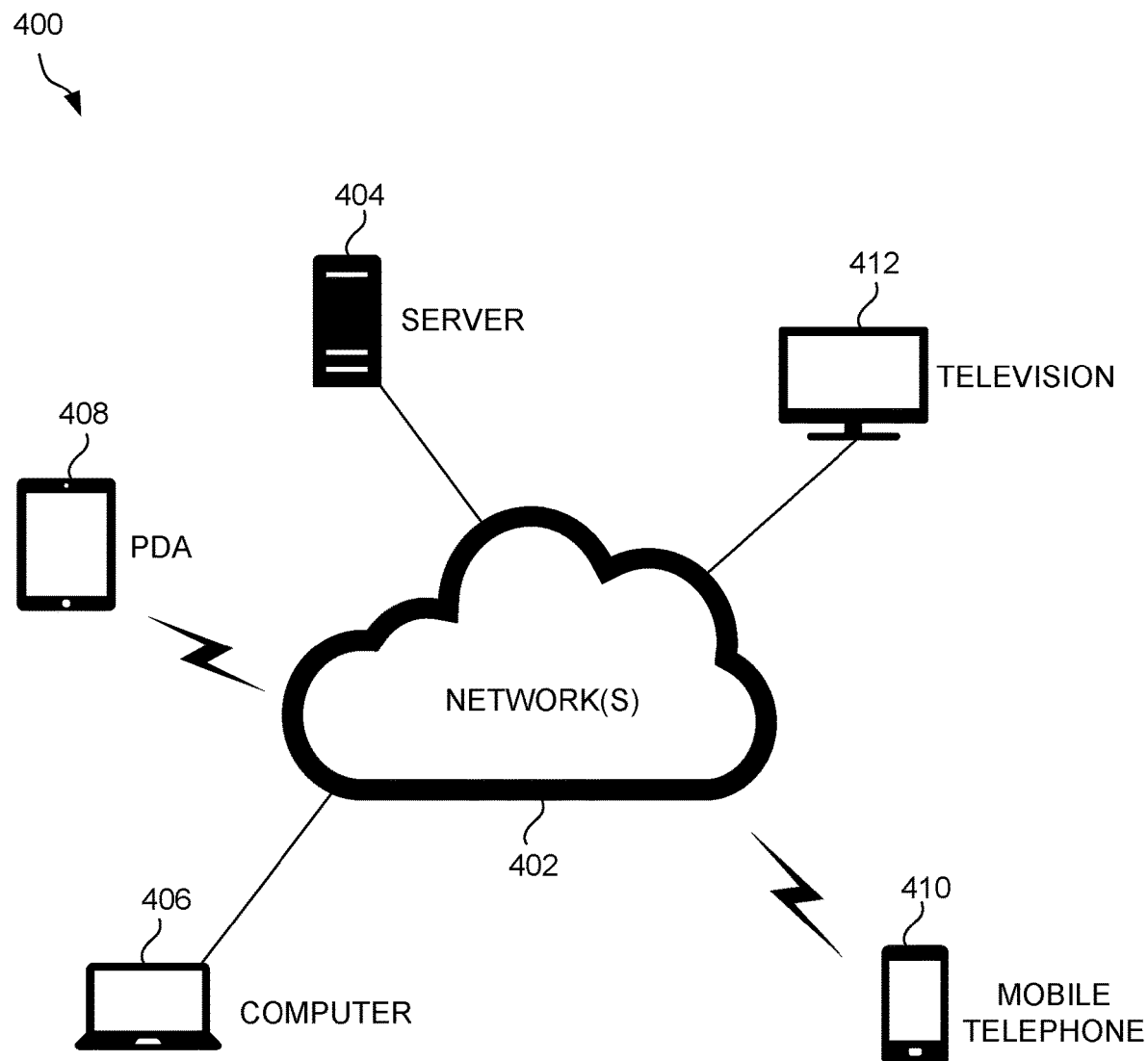
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
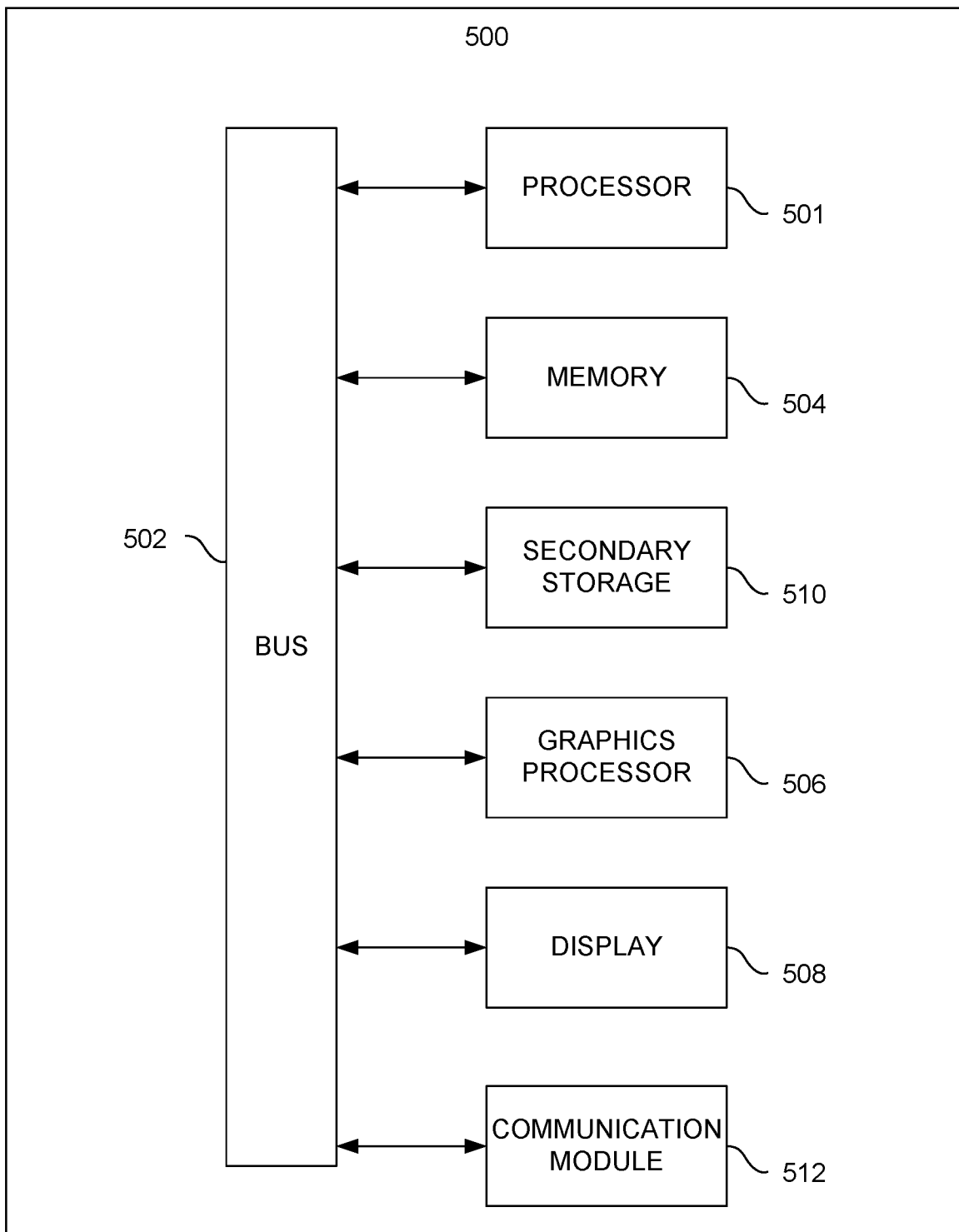
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which, when executed by one or more processors of a device, cause the device to:
   detect a change made to an application;
   determine one or more features of the application impacted by the change made to the application;
   identify a plurality of existing tests associated with the one or more features of the application impacted by the change made to the application by querying a mapping repository storing mappings between application features and tests;
   for each existing test in the plurality of existing tests, predict a probability of the existing test exposing a defect in the application, wherein the probability is predicted based on a mapping in the mapping repository of prior defects detected by the existing test;
   execute at least a portion of the plurality of existing tests for the application in an order that is based on the predicted probabilities including:
      building a regression flow using the at least a portion of the plurality of existing tests in the order that is based on the predicted probabilities, and
      performing the regression flow to execute the at least a portion of the plurality of existing tests;
   detect a defect as a result of the execution of a particular test in the at least a portion of the plurality of existing tests; and
   store in the mapping repository a mapping of the particular test to the defect and to one of the application features to which the particular test applies.

2. The non-transitory computer-readable media of claim 1, wherein the change made to the application includes a modification to existing code of the application.

3. The non-transitory computer-readable media of claim 1, wherein the change made to the application includes new code added to existing code of the application.

4. The non-transitory computer-readable media of claim 1, wherein the change made to the application is detected responsive to a code check-in made via an application development tool.

5. The non-transitory computer-readable media of claim 1, wherein the one or more features of the application impacted by the change made to the application include one or more portions of code that depend on a portion of the application to which the change was made and that are impacted by the change made to the application.

6. The non-transitory computer-readable media of claim 1, wherein the one or more features of the application impacted by the change made to the application include one or more services used by the application that depend on a portion of the application to which the change was made and that are impacted by the change made to the application.

7. The non-transitory computer-readable media of claim 1, wherein executing at least a portion of the plurality of existing tests for the application in an order that is based on the predicted probabilities includes executing at least a portion of the plurality of existing tests from most probable to expose a defect in the application to least probable to expose a defect in the application.

8. The non-transitory computer-readable media of claim 1, wherein executing at least a portion of the plurality of existing tests for the application includes selecting a subset of the plurality of existing tests based on a defined number of tests to be selected for testing the application.

9. The non-transitory computer-readable media of claim 8, wherein the existing tests included in the subset are existing tests having a highest probability of exposing a defect in the application.

10. The non-transitory computer-readable media of claim 9, wherein the existing tests included in the subset are ordered for execution from most probable to expose a defect in the application to least probable to expose a defect in the application.

11. A method, comprising:
   at a computer system:

detecting a change made to an application;
determining one or more features of the application impacted by the change made to the application;
identifying a plurality of existing tests associated with the one or more features of the application impacted by the change made to the application by querying a mapping repository storing mappings between application features and tests;
for each existing test in the plurality of existing tests, predicting a probability of the existing test exposing a defect in the application, wherein the probability is predicted based on a mapping in the mapping repository of prior defects detected by the existing test;
executing at least a portion of the plurality of existing tests for the application in an order that is based on the predicted probabilities including:
  building a regression flow using the at least a portion of the plurality of existing tests in the order that is based on the predicted probabilities, and
  performing the regression flow to execute the at least a portion of the plurality of existing tests;
detecting a defect as a result of the execution of a particular test in the at least a portion of the plurality of existing tests; and
storing in the mapping repository a mapping of the particular test to the defect and to one of the application features to which the particular test applies.

* * * * *